United States Patent [19]

Cramm et al.

[11] Patent Number: 5,422,408
[45] Date of Patent: Jun. 6, 1995

[54] POLYMERIZATION OF DIALLYLDIALKYL AMMONIUM HALIDE COMPOUNDS WITH AZO COMPOUND AND INORGANIC SALT

[75] Inventors: Jeffrey R. Cramm; Fran K. Kravitz, both of Winfield, Ill.

[73] Assignee: Nalco Chemical Company, Naperville, Ill.

[21] Appl. No.: 219,127

[22] Filed: Mar. 29, 1994

Related U.S. Application Data

[63] Continuation-in-part of Ser. No. 88,185, Jul. 6, 1993, abandoned, which is a continuation of Ser. No. 871,300, Apr. 20, 1992, Pat. No. 5,248,744.

[51] Int. Cl.$^6$ ............................ C08F 4/04; C08F 2/16
[52] U.S. Cl. ................... 526/219.2; 526/219.3; 526/237; 526/295
[58] Field of Search .............. 526/237, 215, 219.3, 526/219.2, 219.4, 219.5, 219.6

[56] References Cited

U.S. PATENT DOCUMENTS

| | | |
|---|---|---|
| 2,926,161 | 2/1960 | Butler et al. . |
| 2,982,749 | 5/1961 | Friedrich et al. . |
| 3,288,770 | 11/1966 | Butler . |
| 3,461,163 | 8/1969 | Boothe . |
| 4,092,467 | 5/1978 | Welcher et al. . |
| 4,151,202 | 4/1979 | Hunter et al. . |
| 4,713,431 | 12/1987 | Bhattacharyya ............ 526/207 |
| 4,742,134 | 5/1988 | Butler ...................... 526/238 |
| 4,753,999 | 6/1988 | Keil et al. ............... 525/328.3 |
| 4,774,022 | 9/1988 | Sumi et al. . |

FOREIGN PATENT DOCUMENTS

| | | |
|---|---|---|
| 56-18611 | 2/1981 | Japan . |
| 2046279 | 11/1980 | United Kingdom . |

OTHER PUBLICATIONS

J. Macromol Sci.-Chem., A21 (1984) 593–614. Copolymerization Kenetics of Dimethyl Diallyl Ammonium Chloride Jaeger et al; pp. 593–615.

*Primary Examiner*—Christopher Henderson
*Attorney, Agent, or Firm*—Robert A. Miller; James J. Drake

[57] ABSTRACT

The present invention provides a process for polymerizing diallyldialkyl ammonium compounds to produce polymers with increased molecular weight in which the polymerization is carried out in an aqueous medium containing an inorganic salt and a water soluble free radical initiator that does not react with the inorganic salt or the halide counterion of the diallyldialkyl ammonium halide compound to form a chain transfer or chain terminating agent.

3 Claims, No Drawings

POLYMERIZATION OF DIALLYLDIALKYL AMMONIUM HALIDE COMPOUNDS WITH AZO COMPOUND AND INORGANIC SALT this application is a continuation-in-part of application Ser. No. 08/088,185, filed Jul. 6, 1993, now abandoned, which in turn was a continuation of application Ser. No. 07/871,300, filed Apr. 20, 1992, now, U.S. Pat. No. 5,248,744.

DESCRIPTION

TECHNICAL FIELD OF THE INVENTION

The present invention relates to a process of polymerizing diallyldialkyl ammonium compounds in which the polymerization is carried out in an aqueous medium containing an inorganic salt and a free radical initiator selected so that it does not react with the inorganic salt to form a chain termination agent.

BACKGROUND OF THE INVENTION

Polymers of diallyldialkyl ammonium compounds have a wide variety of uses. The cationic polymers, for example, can be used a flocculants in water and sewage treatment systems, etc. It has been shown that the higher the molecular weight of the resulting cationic polymer, the more effective the polymer is as a flocculating agent.

Methods for polymerizing diallyldialkyl ammonium compounds are well known in the prior art. See. e.g., U.S. Pat. Nos. 2,926,161; 2,982,749; 3,288,770; 3,461,163 and 4,092,467. Typically, polymerization is effected in an aqueous reaction medium containing a free radical initiator.

Fluoride salts have been reported to accelerate the rate of polymerization and to increase the molecular weight of the formed polymers. Halide salts other than fluoride (e.g. NaCl) did not accelerate polymerization. U.S. Pat. No. 4,742,134.

Where NaCl was formed as a by-product of diallyldialkyl ammonium compound preparation, that salt was reported not to interfere with the polymerization, U.S. Pat. No. 4,15 1,202.

Those prior studies on the effects of salts on diallyldialkyl ammonium compound polymerization were performed using diallyldimethyl ammonium chloride as the monomer and ammonium persulfate as the free radical initiator. It is well known that persulfate can react with (oxidize) the chloride ion of diallyldimethyl ammonium chloride or NaCl to produce a chlorine radical that serves to terminate polymerization and decrease the molecular weight of the formed polymer. *Jaeger et al, J. MaCromol. Sci-Chem.*, A21(5):593 (1984).

It is also known that azo initiators such as 2,2'-azobis(2-amidinopropane) dihydrochloride (V-50) can be used in the polymerization of diallyldialkyl ammonium compounds. By way of example, Japanese Patent No. 56-18611 teaches a method of producing a diallyldimethyl ammonium chloride polymer using water soluble azo-based initiators at temperatures below 55° C. The effects of salts on that polymerization method were not reported.

Azo initiators are further reported to increase the molecular weight of formed polymers where the rate of polymerization is low. The effects of salts on that method were not reported. Jaeger et al, *J. Macromol. Sci.-Chem.*, A21(5):593 (1984). East German Patent. No. 141,029 [Chem. Abs., 94, 1222734c (1981) disclosed polymerizing diallyldialkyl ammonium compounds in the presence of persulfate initiators and chloride salts but does not disclose that the presence of those ions enhances the rate of polymerization relative to termination or increases the molecular weight of the formed polymer. Because of the oxidation of chloride by persulfate and the chain terminating effects of formed chlorine radicals, this method is not likely to have the effect of increasing the molecular weight of the formed polymer.

BRIEF SUMMARY OF THE INVENTION

The present invention relates to a process of polymerizing a diallyldialkyl ammonium compound comprising the sequential steps of:

a) forming a polymerization mixture by admixing in an aqueous medium (i) from about 1 percent by weight to about 30 percent by weight of an inorganic salt; and (ii) from about 25 percent by weight to about 70 percent by weight of a diallyldialkyl ammonium halide compound;

b) purging the polymerization mixture with an inert gas;

c) heating the polymerization mixture with agitation to a temperature of from about 20° C. to about 90° C.;

d) slowing feeding to the polymerization mixture from about 0.2 percent by weight to about 5.0 percent by weight of a water soluble free radical initiator, the percent by weight relative to the concentration of the diallyldialkyl ammonium compound with the proviso that neither the inorganic salt nor the halide counterion of the diallyldialkyl ammonium halide compound react with the water soluble free radical initiator to form a chain transfer or chain terminating agent; and e) maintaining the temperature of the polymerization mixture at from about 20° C. to about 90° C. for a time period sufficient to polymerize the diallyldialkyl ammonium halide compound and form a polymer.

In a preferred embodiment, the diallyldialkyl ammonium halide compound is diallyldimethyl ammonium chloride, the inorganic salt is NaCl, the water soluble free radical initiator is 2,2'-azobis(2-amidinopropane) dihydrochloride.

In yet another embodiment of this invention, the polymer is made by the following sequential steps:

a) forming a polymerization mixture by admixing in an aqueous medium (i) from about 1 percent by weight to about 30 percent by weight of an inorganic salt at least partially soluble in the aqueous reaction medium; and (ii) from about 25 percent by weight to about 70 percent by weight of a diallyldialkyl ammonium halide compound.

b) purging said polymerization mixture with an inert gas;

c) heating said polymerization mixture with agitation to a temperature of from about 20° C. to about 90° C.;

d) slowly feeding to said polymerization mixture from about 0.2 percent by weight to about 5.0 percent by weight of a water soluble free radical initiator, the percent by weight relative to the concentration of said diallyldialkyl ammonium halide compound with the proviso that the free radical initiator has a lower reduction potential than the potential required to oxidize the anion of the inorganic salt and the halide counterion of the diallylalkyl ammonium halide compound; and, e) maintaining the temperature of said polymerization mixture at from about 20° C. to about 90° C. for a time period sufficient to polymerize said diallyldialkyl ammonium halide compound and form a polymer.

DETAILED DESCRIPTION OF THE INVENTION

The present invention relates to a process for polymerizing diallyldialkyl ammonium compounds whereby the rate of polymerization is accelerated and the molecular weight of the resulting polymer is increased.

In accordance with the process, polymerization is carried out in an aqueous solution containing an inorganic salt with a water soluble free radical initiator that does not react with the inorganic salt or a counterion of the diallyldialkyl ammonium halide compound to form a chain transfer or chain terminating agent. The inorganic salt accelerates polymer propagation rates relative to chain termination rates, thus producing higher molecular weight polymers.

The detrimental reaction of an initiator with the anion of the inorganic salt or the halide counterion of the diallyldialkly ammonium halide compound is believed to be the oxidation of chloride ion to chlorine atom:

$$S_2O_8^{2-} + Cl^- \rightarrow SO_4^{-} + C \cdot + SO_4^{2-}$$

The primary reaction of the chlorine atoms formed by this reaction is chain termination.

The inorganic salt can be supplied in any form that does not adversely affect the progress of the polymerization reaction and is at least partially soluble in the aqueous reaction medium. Inorganic salts selected for use in our invention cannot be listed independently from the initiator. Also, the counterion of the diallyldialkyl ammonium halide compound must also be considered before choosing an initiator.

Diallyldimethyl ammonium chloride is the lowest cost diallyldialkyl ammonium compound. In this case the initiator must be chosen from those initiators that do not react with the counterion, $Cl^-$. Any azo type initiator that has some water solubility can be used, because the azo group is not a strong enough oxidant to react with $Cl^-$.

Highly water soluble metal salts that are expected to work in conjunction with azo compounds include sodium fluoride, sodium chloride, sodium sulfate, sodium phosphate, potassium fluoride, potassium chloride, potassium sulfate, potassium phosphate, lithium chloride, lithium sulfate, ammonium fluoride, ammonium chloride, ammonium sulfate, ammonium phosphate, magnesium chloride, magnesium sulfate, and calcium chloride. Salts that should be avoided include those that are easily oxidized such as iodide salts and those that are chain transfer agents themselves such as alkali and alkaline earth bisulfites and hypophosphites.

The polymerization medium preferably contains from about 1 percent by weight to about 30 percent by weight, preferable from about 2 percent by weight to about 20 percent by weight, of the inorganic salt.

Water soluble free radical initiators that can be used in processes for polymerizing diallyldialkyl ammonium compounds are well known in the art. The only limitation is that the water soluble free radical initiator not react with (e.g. oxidize) the inorganic salt or a counterion of the diallyldialkyl ammonium compound to form chain transfer or chain terminating agents that lower the molecular weight of the polymer.

Because azo compound initiators are not strong oxidants, such azo compounds are preferred water soluble; free radical initiators for use in the polymerization process of the present invention. Such initiators can be used with any of the inorganic salts disclosed herein. Exemplary azo compound initiators include azo compounds such as 2,2'-azobis(isobutyronitrile), 2-(carbamoylazo)isobutyronitrile, azo-bisisobutyramidine dihydrochloride (or as the free base), 2,2'-azobis'(N, N'-dimethyleneisobutyramidine) dihydrochloride (or as the free base), 4,4'-azo-bis(4-cyanopentanoic acid), 2,2'-azobis(2-amidinopropane) dihydrochloride (V-50) and the like. 2,2'-Azobis(2-amidinopropane) dihydrochloride (V-50) is preferred.

Initiators other than azo compounds can be used as long as they do not undergo reactions with the salts or the counterion of the diallyldialkyl ammonium compound to form chain terminating agents. This may even include peroxydisulfate initiators in the presence of salts with unreactive ions such as sulfate or phosphate.

When the initiator is ammonium, sodium, or potassium peroxydisulfate, neither the anion of the inorganic salt or the halide counterion of the diallyldialkyl ammonium compound can be chloride. Suitable counterions that will not be oxidized by peroxydisulfate are fluoride, sulfate, or phosphate. Salts that are expected to work in these cases include sodium fluoride, sodium sulfate, sodium phosphate, potassium fluoride, potassium sulfate, potassium phosphate, lithium sulfate, ammonium fluoride, ammonium sulfate, ammonium phosphate, and magnesium sulfate.

Any organic peroxide which can generate free radicals such as alkyl peroxides, peroxyesters, diacylperoxides, and hydroperoxides may also be used in the above cases in place of peroxydisulfate.

A criteria that can be helpful in selecting appropriate counterion-initiator-salt combinations makes use of standard redox potentials.

Data on oxidation and reduction potentials can be used to decide if an undesirable reaction between the initiator and the ion of interest might be spontaneous. The following reactions were taken from a listing of standard reduction potentials found in the Handbook of Chemistry and Physics, 481th Edition, p. D-86, published by the Chemical Rubber Company, Cleveland, 1967.

$$Br_2 + 2e^- \rightleftharpoons 2Br^- + 1.087 \text{ volts}$$

$$Cl_2 + 2e^- \rightleftharpoons 2Cl^- + 1.36 \text{ volts}$$

$$S_2O_8^{2-} + 2e^- \rightleftharpoons 2SO_4^{2-} + 2.01 \text{ volts}$$

$$F_2 + 2e^- \rightleftharpoons 2F^- + 2.87 \text{ volts}$$

Peroxydisulfate is strong enough to oxidize chloride ions, and would not be used in combination with chloride containing salts (diallyldimethyl ammonium chloride) in the practice of this invention. Peroxydisulfate does not oxidize fluoride, therefore it can be used to polymerize dialkyldimethylammonium fluorides in the presence of fluoride salts in the practice of this invention.

Accordingly, the reduction potential of the selected initiator should be less than that required for the oxidation of the anion of the inorganic salt or the halide counterion of the diallyldialkyl ammonium halide compound.

Generally, organic based water soluble free radical initiators have lower reduction potentials than commonly used inorganic salts and the halogen counterions used in the diallyldimethyl ammonium chloride compounds. These materials include the so-called azo compounds described above, some organic peroxides, and the like.

Some salts cannot be oxidized by any of the generally available red-ox initiators and are suitable for use with all commonly available red-ox initiator systems. The anions of these salts include phosphate and sulfate, among others.

The amount of the water soluble free radical initiators used in the polymerization process of the present invention is dependent upon the amount of the diallyldialkyl ammonium halide compound. The water soluble free radical initiator is present at a concentration of from about 0.2 to about 5.0 percent by weight of the diallyldialkyl ammonium compound.

The water soluble free radical initiator is slowly fed (added) to a polymerization mixture containing an inorganic salt, and the diallyldialkyl ammonium halide compound.

In a preferred embodiment, the water soluble free radical initiator is added in two separate steps. In accordance with that embodiment, from about 30 percent to about 75 percent of the total amount of initiator is slowly added to a polymerization mixture which is heated to from about 20° C. to about 90° C. until polymerization is from about 50 percent to about 90 percent complete. The remaining amount of the water soluble free radical initiator is then added to the polymerization mixture and the mixture heated to from about 20° C. to about 90° C. for a period of time sufficient to complete the polymerization.

Although the invention is applicable to the polymerization of any diallyldialkyl ammonium compound, it is particularly applicable for the polymerization of diallyldialkyl halides and, preferably diallyldialkyl ammonium chlorides. In a preferred embodiment, the diallyldialkyl ammonium compound is diallyldimethyl ammonium chloride (DADMAC).

The polymerization medium preferably contains from about 10 percent by weight to about 70 percent by weight, preferably from about 20 percent by weight to about 60 percent by weight, of the monomer.

Preferably the polymerization process is carried out in the absence of oxygen. Oxygen can be removed from the polymerization mixture by purging the latter with an inert gas such as nitrogen or argon. The polymerization process can then be conducted under a blanket of the inert gas.

Preferably, the temperature of the reaction is maintained at between about 20° C. and about 90° C., most preferably between about 30° C. and about 70° C. The reaction (polymerization) mixture is preferably an aqueous medium to ensure maximum solubility of the reactants.

In one embodiment, a process of polymerizing a diallyldialkyl ammonium compound comprises the sequential steps of:

a) forming a polymerization mixture by admixing in an aqueous medium (i) from about 1 percent by weight to about 30 percent by weight of an inorganic salt; and (ii) from about 25 percent by weight to about 70 percent by weight of a diallyldialkyl ammonium halide compound;

b) purging the polymerization mixture with an inert gas;

c) heating the polymerization mixture with agitation to a temperature of from about 20° C. to about 90° C.;

d) slowing feeding to the polymerization mixture from about 0.2 percent by weight to about 5.0 percent by weight of a water soluble free radical initiator, the percent by weight relative to the concentration of the diallyldialkyl ammonium compound with the proviso that neither the inorganic salt nor the halide counterion of the diallyldialkyl ammonium halide compound react with the water soluble free radical initiator to form a chain transfer or chain terminating agent; and e) maintaining the temperature of the polymerization mixture at from about 20° C. to about 90° C. for a time period sufficient to polymerize the diallyldialkyl ammonium compound and form a polymer.

Those skilled in the art, being aware of the principles of the present invention as disclosed herein, will be capable of selecting particular values of the various parameters (e.g. inorganic salt concentration, free radical initiator concentration and temperature) to achieve particular desired results without undue experimentation.

After polymerization, the polymer may be recovered, i.e., removed from the reactor and handled as necessary. It may be diluted with water and used as such, or the polymer can be isolated by the usual procedures of isolating polymers. The polymer can be converted to a desired salt form by either ion exchange (U.S. Pat. No. 3,288,770), dialysis, or ultrafiltration.

The following example illustrates a particular embodiment of the present invention and is not limiting of the specification and claims in any way.

EXAMPLE 1

Effects of NaCl on DADMAC Polymerization

A polymerization mixture was formed by admixing in an aqueous medium (i) various concentrations of diallyldimethyl ammonium chloride (DADMAC), (ii) various concentrations of NaCl and (iii) 0.010 percent by weight EDTA tetra sodium salt. The polymerization mixture was purged with nitrogen gas and heated with agitation to a temperature of from 52° C. to 62° C. A solution containing the desired amount 2,2'-azobis (2-amidinopropane) dihydrochloride (V-50) (from 0.50 to about 1.50 percent by weight relative to the diallydimethyl ammonium chloride concentration) was slowly fed to the polymerization mixture and the temperature was maintained at 52° C. to 62° C. until polymerization was 80-90 percent complete (4-12 hours). Water was added as necessary to control bulk viscosity and maintain mixing. The mixture was heated to 82° C. and an additional amount of 2,2'-azobis(2-amidinopropane) dihydrochloride) (V-50) (from about 0.50 to about 1.50 percent by weight relative to the diallydimethyl ammonium chloride concentration) was added. The temperature was maintained at about 81° C. for 1 hour to complete the polymerization.

The polymer was recovered and the percent conversion and intrinsic viscosity determined using standard procedures well known to one of ordinary skill in the art. The results of these studies are summarized in Table 1, below.

TABLE I

DADMAC Polymerization

| Initial DADMAC Conc (wt %) | Initial NaCl Conc (Wt %) | V-50 Level as % of Monomer | Polymerization Temp (deg C.) | Percent Conversion | Intrinsic Viscosity* |
|---|---|---|---|---|---|
| 47 | 2 | 0.99 | 52 | 86 | 0.98 |
| 47 | 20 | 0.99 | 52 | 91 | 1.45 |
| 47 | 2 | 0.99 | 62 | 89 | 0.94 |
| 47 | 20 | 0.99 | 62 | 91 | 1.64 |
| 47 | 2 | 2.97 | 52 | 95 | 0.96 |
| 47 | 20 | 2.97 | 52 | 97 | 1.46 |
| 47 | 2 | 2.97 | 62 | 96 | 0.87 |
| 47 | 20 | 2.97 | 62 | 98 | 1.17 |
| 67 | 2 | 0.99 | 52 | 86 | 1.31 |
| 67 | 20 | 0.99 | 52 | 86 | 2.07 |
| 67 | 2 | 0.99 | 62 | 91 | 1.34 |
| 67 | 20 | 0.99 | 62 | 92 | 1.80 |
| 67 | 2 | 2.97 | 52 | 93 | 1.49 |
| 67 | 20 | 2.97 | 52 | 94 | 1.84 |
| 67 | 2 | 2.97 | 62 | 94 | 1.07 |
| 67 | 20 | 2.97 | 62 | runaway | reaction |
| 57 | 11 | 1.98 | 57 | 95 | 1.47 |
| 57 | 11 | 1.98 | 57 | 96 | 1.29 |
| 57 | 11 | 1.98 | 57 | 95 | 1.42 |

*dL/g, measured in 1.0 M sodium nitrate

The results clearly show that polymer molecular weights are increased by the presence of the inorganic salt, NaCl, in the polymerization mixture.

Although the present invention has now been described in terms of certain preferred embodiments, and exemplified with respect thereto, one skilled in the art will readily appreciate that various modifications, changes, omissions and substitutions can be made without departing from the spirit thereof.

Experiments were conducted to demonstrate whether a chelating agent was necessary in producing higher molecular weight diallyldimethyl ammonium chloride polymers in aqueous solution containing an inorganic salt using a water soluble free radical initiator, 2,2'-azobis(2-amidinopropane) dihydrochloride.

Polymers were prepared using the following method:
Polymerization mixtures consisting of (i) 51 percent by weight of diallyldimethyl ammonium chloride, (iii) 18.4 percent by weight of NaCl and (iii) 0, 0.026 or 0.052 percent by weight EDTA tetrasodium salt, respectively, were formed by mixing in an aqueous medium. The polymerization mixtures were purged with nitrogen gas and heated to 57° C. A total of 0.49 percent by weight of 2,2'-azobis(2-amidinopropane) dihydrochloride based on the weight of diallyldimethyl ammonium chloride was added to each of the polymerization mixtures and the temperature maintained at 57° C. for nine hours. The temperature was increased to 82° C. and when the temperature stabilized, an additional 0.49 percent by weight of 2,2'-azobis(2-amidinopropane) dihydrochloride based on the weight of the diallyldimethyl ammonium chloride was added to each of the mixtures. The temperature was maintained at 82° C. until the polymerization was complete (about 1-2 hours).

The polymers were recovered and the percent conversion and intrinsic viscosity determined using standard procedures. The results are presented in Table II.

Results indicate that the chelating agent, ethylenediamine tetraacetic acid tetrasodium salt, has no effect on the final conversion of the polymers. The slight differences in intrinsic viscosity can be related to processing variations (i.e., nitrogen rate, slight temperature fluctuations, etc.) during the polymerization or method potential of measuring the intrinsic viscosity and not the presence of the chelating agent. Based on these experiments, the use of a chelating agent appears to be unnecessary in the production of higher molecular weight diallyldimethyl ammonium chloride polymers in an aqueous solution containing an inorganic salt using 2,2'-azobis(2-amidinopropane) dihydrochloride.

TABLE II

| Initial DADMAC Conc (wt %) | Initial NaCl Conc (Wt %) | EDTA Conc (wt %) | Polymerization Temp (deg C.) | Percent Conv. | Intrinsic Viscosity* |
|---|---|---|---|---|---|
| 51 | 18.4 | 0 | 57 | 94 | 1.74 |
| 51 | 18.4 | 0.026 | 57 | 93 | 1.82 |
| 51 | 18.4 | 0.026 | 57 | 94 | 1.60 |
| 51 | 18.4 | 0.052 | 57 | 94 | 1.81 |

*Dl/g, measured in 1.0 M sodium nitrate (corrected for conversion)
In all experiments total azo (V50) initiator injected was 0.60% based on the mole percent of diallyldialkyl ammonium chloride.

Having described our invention, we claim:

1. A process of polymerizing a diallyldialkyl ammonium compound comprising the sequential steps of:
   a) forming a polymerization mixture by admixing in an aqueous medium (I) from about 1 percent by weight to about 30 percent by weight of sodium chloride; and (ii) from about 25 percent by weight to about 70 percent by weight of a diallyldialkyl ammonium halide compound;
   b) purging the polymerization mixture with an inert gas;
   c) heating the polymerization mixture with agitation to a temperature of from abut 20° C. to about 90° C.;
   d) slowly feeding to the polymerization mixture from about 0.2 percent by weight to about 5.0 percent by weight of 2.2'-azobis(2-amidinopropane) dihydrochloride, the percent by weight relative to the concentration of the diallyldialkyl ammonium compound with the proviso that neither the inorganic salt nor the halide counterion of the diallyldialkyl ammonium halide compound react with the water soluble free radical initiator to form a chain transfer or chain terminating agent; and
   e) maintaining the temperature of the polymerization at from about 20° C. to about 90° C. for a time period sufficient to polymerize the diallyldialkyl ammonium compound and form a polymer.

2. The process according to claim 1 wherein said diallyldialkyl ammonium halide compound is diallyldimethyl ammonium chloride.

3. The process according to claim 1 further comprising the step of recovering said polymer.

* * * * *